United States Patent
Corrales et al.

(10) Patent No.: US 9,213,855 B1
(45) Date of Patent: Dec. 15, 2015

(54) TRUSTED USER CIRCLES

(71) Applicant: Narus, Inc., Sunnyvale, CA (US)

(72) Inventors: Ignacio Bermudez Corrales, Sunnyvale, CA (US); Antonio Nucci, San Jose, CA (US)

(73) Assignee: Narus, Inc., Sunnyvale, CA (US)

( * ) Notice: Subject to any disclaimer, the term of this patent is extended or adjusted under 35 U.S.C. 154(b) by 29 days.

(21) Appl. No.: 14/294,080

(22) Filed: Jun. 2, 2014

(51) Int. Cl.
*H04L 9/32* (2006.01)
*G06F 21/62* (2013.01)

(52) U.S. Cl.
CPC .................................. *G06F 21/6209* (2013.01)

(58) Field of Classification Search
CPC ............. G06Q 10/00; G06Q 30/0222; G06Q 30/0225; G06Q 30/0601; G06Q 30/0613; G06Q 40/00; G06Q 40/04; G06Q 50/10; G06Q 30/00; G06Q 10/10; G06Q 30/0609; G06Q 30/0633; G06Q 30/0641; G06Q 50/18
USPC .......................................... 713/165; 707/694
See application file for complete search history.

(56) References Cited

U.S. PATENT DOCUMENTS

| | | | | |
|---|---|---|---|---|
| 8,954,740 B1 * | 2/2015 | Moscaritolo | ............ | H04L 29/06 380/277 |
| 2004/0158712 A1 * | 8/2004 | Lee | ......................... | G06F 21/10 713/165 |
| 2012/0109830 A1 * | 5/2012 | Vogel | .................... | G06Q 20/382 705/75 |

OTHER PUBLICATIONS

Wikipedia, "Pretty Good Privacy", Retrieved from http://en.wikipedia.org/wiki/Pretty_Good_Privacy, Jun. 2014.
BlockPRISM. Retrieved from https://chrome.google.com/webstore/detail/blockprismorg-encrypted-f/noafiojdhkjpcdjfbmaigongklcimikn?hl=en, Jun. 2014.
Maheswaran, John, et al., "Crypto-Book: An Architecture for Privacy Preserving Online Identities", Hotnets '13, Nov. 21-22, 2013, retrieved from http://www.crypto-book.com/.
"Encrypt Your Facebook Postings with Uprotect.It". Retrieved from http://allfacebook.com/encrypt-your-facebook-postings-with-uprotect-it__b30477, Jun. 2014.
"How will scrambls work for me?" Retrieved from https://scrambls.com/, Jun. 2014.
Abine, Inc., "Protect Your Privacy". Retrieved from http://www.abine.com/index.html, Jun. 2014.
"Off-the-Record Messaging", Retrieved from https://otr.cypherpunks.ca/, Jun. 2014.

* cited by examiner

*Primary Examiner* — Dant Shaifer Harriman
*Assistant Examiner* — Abiy Getachew
(74) *Attorney, Agent, or Firm* — Kwan & Olynick LLP

(57) ABSTRACT

A trusted user circle server for encryption key distribution and authentication support, as well as a client-side application which resides on user's devices are disclosed. In particular, the trusted user circle server manages a repository for static public keys (SPUK) which are used for authentication and secure distribution of a dynamic private context key (DPCK) used for the end-to-many encryption. Accordingly, posting users encrypt posted document using the DPCK and viewing users retrieve the DPCK to decrypt the posted document. These keys are associated to the trusted user circle and are generated dynamically for a given circle policy context (CPC). The CPC is an identifier that represents a group of members of a trusted user circle. It changes whenever any member of the trusted user circle leave it, when a new trusted user circle is created or when the DPCK expires after a predetermined period of time.

17 Claims, 6 Drawing Sheets

TRUSTED USER CIRCLES

BACKGROUND

A social network is a social structure (e.g., community) made of members (e.g., a person or a user) connected by social relationships such as friendship, kinship, relationships of beliefs, knowledge, prestige, culture, etc. Individual computers linked electronically are used to form the basis of computer mediated social interaction and networking within a social network community. A social networking service is a platform to build computer mediated social networks. Throughout this disclosure, the terms "social network" and "social network service" may be used interchangeably and refer to a computer mediated social network having computer servers to facilitate social interaction among members of the social network. Many social networks are web-based that allow each individual user to create a public profile, to create a list of users (referred to as social network friends) with whom to share information, and to exchange social network messages (e.g., e-mail and instant messaging) as well as share user posted documents (e.g., photo/video/sharing and blog posting) among social network friends. In a broader sense, the term "social network" may also refer to other online communities, such as Internet forum, or message board, that is an online discussion site where users hold conversations in the form of posted messages.

Examples of computer mediated social network services include Facebook® (a registered trademark of Facebook, Inc., Palo Alto, Calif.), Myspace® (a registered trademark of Myspace, Inc., Beverly Hills, Calif.), Twitter® (a registered trademark of Twitter, Inc., San Francisco, Calif.), LinkedIn® (a registered trademark of LinkedIn, Ltd., Mountain View, Calif.), etc. Certain social network services provide application programming interfaces (APIs) allowing programmatic retrieval of social network messages by third party developers.

Public-key cryptography, also known as asymmetric cryptography, is a class of cryptographic algorithms which require two separate keys, one of which is secret (or private) and one of which is public. Although different, the two parts of this key pair are mathematically linked. The public key is used for encryption; whereas the private key is used for decryption. The term "asymmetric" stems from the use of different keys to perform these opposite functions, each the inverse of the other. In contrast, symmetric cryptography relies on the same key to perform both encryption and decryption.

SUMMARY

In general, in one aspect, the invention relates to a method to view user posted documents on a website. The method includes generating, by an posting user device used by an posting user, first metadata of a first document, wherein the first metadata identifies a trusted user circle comprising the posting user and a viewing user, encrypting, by the posting user device based on a dynamic private context key (DPCK) of the trusted user circle, the first document to generate a first encrypted document, wherein the DPCK is provided to the trusted user circle, sending, by the posting user device to the website, the first encrypted document associated with the first metadata, wherein the first encrypted document associated with the first metadata is posted on the website as a first posted document, wherein the first posted document is obtained from the website by a viewing user device used by the viewing user, analyzing, by the viewing user device, the first metadata in the first posted document to identify the DPCK based on the viewing user being within the trusted user circle, and decrypting, by the viewing user device in response to identifying the DPCK and based on the DPCK, the first posted document to retrieve the first document to present to the viewing user.

In general, in one aspect, the invention relates to a system to a system for viewing user posted documents on a website. The system includes (i) a trusted user circle server separate from the web site and configured to maintain membership information of a trusted user circle, wherein the trusted user circle comprises an posting user and a viewing user, and provide a dynamic private context key (DPCK) of the trusted user circle to members of the trusted user circle, (ii) an posting user device used by the posting user and configured to generate first metadata of a first document, wherein the first metadata identifies the trusted user circle, encrypt, based on the DPCK obtained from the trusted user circle server, the first document to generate a first encrypted document, and send, to the website, the first encrypted document associated with the first metadata, wherein the first encrypted document associated with the first metadata is posted on the website as a first posted document, and (iii) a viewing user device used by the viewing user and configured to obtain the first posted document from the website, analyze the first metadata in the first posted document to identify the DPCK based on the viewing user being within the trusted user circle, and decrypt, in response to identifying the DPCK and based on the DPCK, the first posted document to retrieve the first document to present to the viewing user.

In general, in one aspect, the invention relates to a non-transitory computer readable medium storing instructions for viewing user posted documents on a website, the instructions when executed by a computer processor comprising functionality to generate, by an posting user device used by an posting user, first metadata of a first document, wherein the first metadata identifies a trusted user circle comprising the posting user and a viewing user, encrypt, by the posting user device based on a dynamic private context key (DPCK) of the trusted user circle, the first document to generate a first encrypted document, wherein the DPCK is provided to the trusted user circle, send, by the posting user device to the website, the first encrypted document associated with the first metadata, wherein the first encrypted document associated with the first metadata is posted on the website as a first posted document, wherein the first posted document is obtained from the website by a viewing user device used by the viewing user, analyze, by the viewing user device, the first metadata in the first posted document to identify the DPCK based on the viewing user being within the trusted user circle, and decrypt, by the viewing user device in response to identifying the DPCK and based on the DPCK, the first posted document to retrieve the first document to present to the viewing user.

Other aspects of the invention will be apparent from the following detailed description and the appended claims.

DETAILED DESCRIPTION

Figure 1:
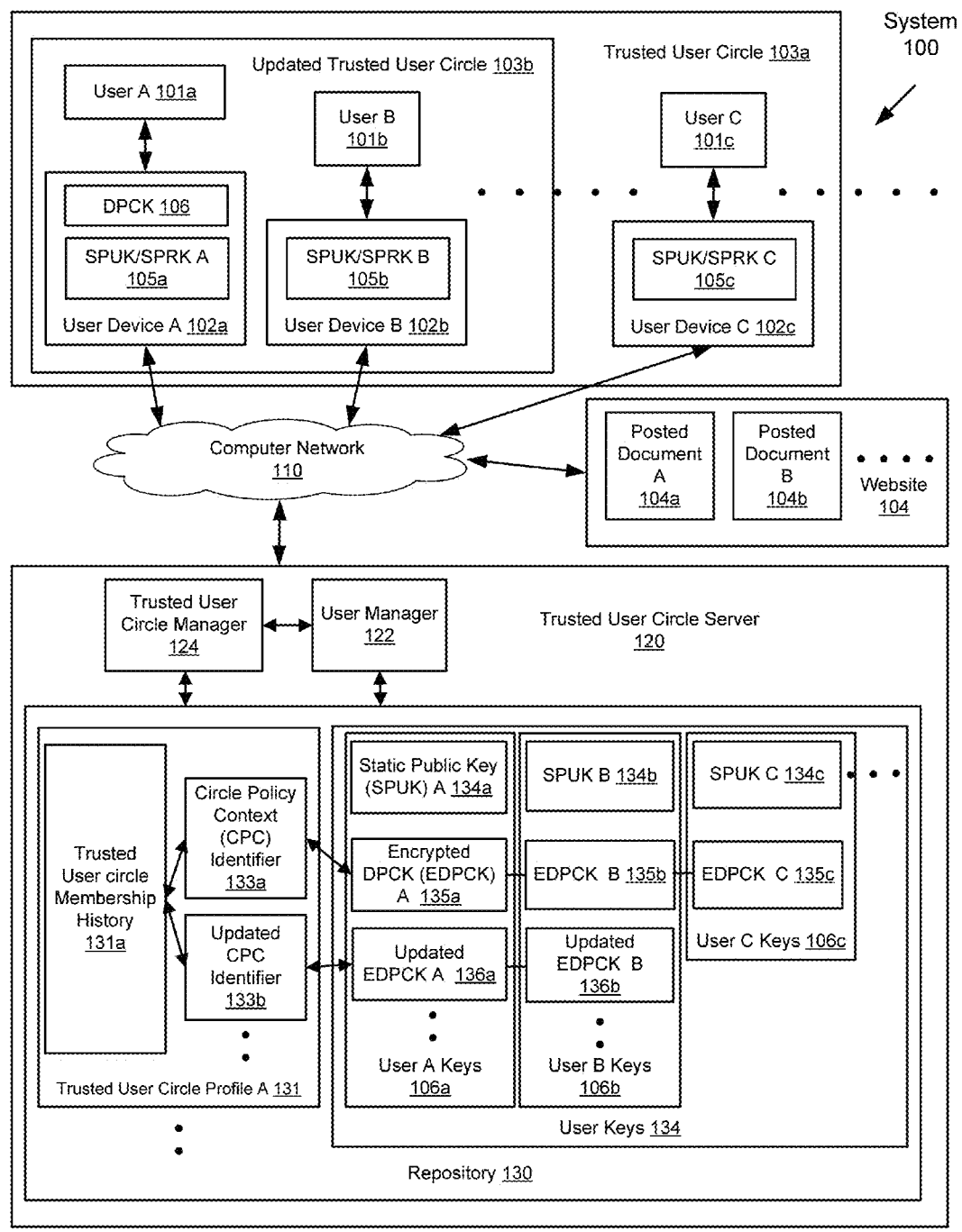
FIG. 1 shows a schematic diagram of a system of trusted user circles in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention provide a trusted user circle server for encryption key distribution and authentication support, as well as a client-side application which resides on user's devices. In one or more embodiments, the trusted user circle server manages a repository for static public keys (SPUK) which are used for authentication and secure distribution of a dynamic private context key (DPCK) used for the end-to-many encryption. Accordingly, posting users encrypt posted document using the DPCK and viewing users retrieve the DPCK to decrypt the posted document. These keys are associated to the trusted user circle and are generated dynamically for a given circle policy context (CPC). The CPC is an identifier that represents a group of members of a trusted user circle. It changes whenever any member of the trusted user circle leave it, when a new trusted user circle is created or when the DPCK expires after a pre-determined period of time.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a social survey system in accordance with embodiments disclosed herein.

As shown in FIG. 1, the system (100) includes various components coupled via computer network (110), These components include users (e.g., user A (101a), user B (101b), user C (101c), etc.) and corresponding user devices (e.g., user device A (102a), user device B (102b), user device C (102c), etc.), a website (104), and a trusted user circle server (120). In one or more embodiments, the computer network (110) may include wired and/or wireless portions of the Internet and/or other data communications networks such as wide area networks (WANs), local area networks (LANs), etc. As shown, a portion of the users may be members of various trusted user circles that allow members to join or exit from time to time. For example, the user A (101a), user B (101b), user C (101c), etc. are members of the trusted user circle (103a), while the user A (101a), user B (101b), etc. remain members of the updated trusted user circle (103b) subsequent to the user C (101c) exiting the trusted user circle (103a). Although only the trusted user circle (103a) and updated trusted user circle (103b) are shown in FIG. 1, other overlapping or non-overlapping trusted user circles (not shown) may also exist in the system (100). In addition, certain users (not shown) may not be members of any trusted user circle but merely users of the website (104). Throughout this disclosure, an action performed by the user device as directed by the user may be referred to as being performed by the user of the user device.

Further as shown in FIG. 1, the trusted user circle server (120) includes a user manager (122), trusted user circle manager (124), and repository (130). In one or more embodiments, the user manager (122) and trusted user circle manager (124) include software, hardware, or a combination thereof that collectively perform tasks of the trusted user circle server (120) based on information stored in the repository (130). The repository (130) may be used for storing trusted user circle profiles of various trusted user circles and user keys (134) accessible to members of various trusted user circles. As shown, the trusted user circle profile A (136a) includes information associated with the trusted user circle (103a) and updated versions thereof. In addition, the user keys (134) include user A keys (106a) having static public key (SPUK) A (134a), encrypted dynamic private context key (EDPCK) A (135a), and updated EDPCK A (136a) of the user A (101a), user B keys (106b) having SPUK B (134b), EDPCK B (135b), and updated EDPCK B (136b) of user B (101b), user C keys (106c) having SPUK C (134c) and encrypted DPCK C (135c) of user C (101c), and other user's keys. The repository (130) (and/or any of the data collections stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The repository (130) may be a device internal to the trusted user circle server (120). Alternatively, the repository (130) may be an external storage device operatively connected to the trusted user circle server (120).

In one or more embodiments, the users are individuals or persons who use the website (104) for accessing information, such as the posted document A (104a), post document B (104b), etc. The user devices include any device configured with computing and communication capability, such as a smart phone, tablet computer, notebook computer, desktop computer, personal digital assistant, gaming device, etc. As noted above, the user A (101a), user B (101b), and user C (101c) are members of one or more trusted user circles and are also users of the trusted user circle server (120). In one or more embodiments, the website (104) may be a social network website, email website, Internet forum website, blog website, or other online community website where user posted information are shared by users according to access credentials and policies of the website (104). In one or more embodiments, the trusted user circle server (120) in cooperation with associated client applications (e.g., a browser plug-in, a mobile app, etc.) installed on user devices provide functionalities that allow users to join one or more trusted user circles for sharing user posted documents on the website (104) with an additional layer of access control. This additional layer of access control is in addition to and separate from the access credentials and policies of the website (104). In one or more embodiments, the trusted user circle server (120) in cooperation with associated client applications installed on user devices provide the aforementioned functionalities using the method described in reference to FIG. 2 below.

Turning to each of the components within the trusted user circle server (120), in one or more embodiments of the invention, the trusted user circle server (120) includes the user manager (122) that is configured to manage user keys (134) for authenticating user access to the trusted user circle server (120) and functionalities provided therefrom. In one or more embodiments, when a user registers to access functionalities of the trusted user circle server (120) (e.g., by creating an account on the trusted user circle server (120)), the user manager (122) generates a random token (referred to as the static seeding token or SST) for the user and sends this user specific SST to the user device. In response, the user device (in particular, a client application executing on the user device) generates an encryption key based on the SST and a user attribute (e.g., a password). In one or more embodiments, the encryption key is a public and private key pair based on asymmetric cryptography. The public and private keys remain unchanged regardless if the user joins or exits any trusted user circle and therefore are referred to as static keys. Specifically, the public key is referred to as a static public key (SPUK) and the private key is referred to as a static private key (SPRK). Once generated, the user device uploads the SPUK to the trusted user circle server (120) where the user manager (122) stores the uploaded SPUK in the user keys (134). This mechanism ensures that even if two different users have the same password, their SPUKs are different and it allows portability of the SPRK among all the user's devices.

As shown in FIG. 1, the user device A (102a) generates the key pair SPUK/SPRK A (105a) and uploads the SPUK portion of the key pair to the trusted user circle server (120) as the SPUK A (134a). Similarly, the user device B (102b) generates the key pair SPUK/SPRK B (105b) and uploads the SPUK portion of the key pair to the trusted user circle server (120) as the SPUK B (134b). Further, the user device C (102c) generates the key pair SPUK/SPRK C (105c) and uploads the SPUK portion of the key pair to the trusted user circle server (120) as the SPUK C (134c).

In one or more embodiments, access to the trusted user circle server (120) and information stored in the repository (130) requires user authentication. In one or more embodiments, the users authenticate with the trusted user circle server (120) using their SPRKs. Since the trusted user circle server (120) has a copy of all the users' SPUKs, the user manager (122) sends a random challenge phrase to the user during authentication, plus a copy of the previously generated user specific SST if the user device needs to regenerate the SPRK. In response, the user encrypts a response phrase using his/her SPRK and sends the encrypted response phrase back to the trusted user circle server (120). Accordingly, the user manager (122) decrypts the encrypted response phrase using the user's SPUK and if the challenge and response phrases perfectly aligns then the user is authenticated. After being authenticated, the user may choose to either to store the SPRK on his/her user device for future use or to regenerate the SPRK each time the user accesses the trusted user circle server (120).

In one or more embodiments of the invention, the trusted user circle server (120) includes the trusted user circle manager (124) that is configured to manage the trusted user circle profiles for controlling user access to posted documents on the website (104) based on the aforementioned additional layer of access control. In one or more embodiments, the trusted user circle (103a) is created and organized by an organizing user, such as the user A (101a). Accordingly, the user A (101a) is referred to as the organizing user and the user device A (102a) is referred to as the organizing user device. In one or more embodiments, in response to a circle creation request from the user A (101a) to create the trusted user circle (103a), the trusted user circle manager (124) creates an identifier of the trusted user circle (103a) and stores the identifier as the circle policy context (CPC) identifier A (133a) the trusted user circle profile A (136) of the trusted user circle (103a).

In one or more embodiments, in response to a member invitation request from the user A (101a), the trusted user circle manager (124) sends an invitation to the user device B (102b) and user device C (102c) to invite the user B (101b) and user C (101c) to join the trusted user circle (103a). Accordingly, the user B (101b) and user C (101c) join the trusted user circle (103a) in response to the invitation. For example, one or more of the user B (101b) and user C (101c) may already be users of the trusted user circle server (120) prior to receiving the invitation and can readily accept the invitation to join the trusted user circle (103a). In another, example, one or more of the user B (101b) and user C (101c) may not be users of the trusted user circle (103a) upon receiving the invitation and will need to register for account creation on the trusted user circle server (120) before becoming members of the trusted user circle (103a).

In one or more embodiments, the CPC identifier (133a) is updated in response to one or more pre-determined events, such as any member exiting the trusted user circle (103a), or the expiration of a pre-determined expiration period. In one or more embodiments, the CPC identifier (133a) remains unchanged when any new member joins the trusted user circle (103a). In one or more embodiments, the CPC identifier (133a) is updated when the user C (101c) exits the trusted user circle (103a). Upon the user C (101c) exiting, the trusted user circle (103a) is updated to become the updated trusted user circle (103b). Accordingly, the trusted user circle manager (124) updates the CPC identifier (133a) to generate an updated version of the CPC identifier (133b). As shown in FIG. 1, this update version is stored in the trusted user circle profile A (136) as the updated CPC identifier (133b). Additional versions of the CPC identifier (133a) may continue to be generated and stored in the trusted user circle profile A (136) as other members exit the trusted user circle (103a) or as pre-determined expiration periods expire periodically. In one or more embodiments, as the membership of the trusted user circle (103a) evolves due to new member joining and/or existing member exiting, the trusted user circle manager (124) keep track of the membership history in the trusted user circle membership history (131a). In one or more embodiments, those membership change events in the trusted user circle membership history (131a) and including removal of any exiting member are linked to corresponding CPC identifiers, as indicated by the arrows connecting the trusted user circle membership history (131a) to the CPC identifier (133a) and the updated CPC identifier (133b).

When a new CPC identifier (e.g., CPC identifier (133a)) or a new version (e.g., updated CPC identifier (133b)) is created, a dynamic private context key (DPCK) (e.g., DPCK (106)) or an updated version of the DPCK (not shown) is generated by the organizing user device (e.g., user device A (102a)). In one or more embodiments, the DPCK (106) is a pseudo random key that is generated by the user device A (102a) with the combination of the CPC identifier (133a) and the SPRK of user A (101a). For example, in response to creating the trusted user circle (103a), the user device A (102a) may obtain the CPC identifier (133a) from the trusted user circle manager (124) to generate the DPCK (106). In another example, in response to an indication that the user C (101c) has exit the trusted user circle (103a), the user device A (102a) may obtain the update CPC identifier (133b) from the trusted user circle manager (124) to generate an updated version of the DPCK (106). Such indication may come from the user A (101a) processing the removal of the user B (101b) from the trusted user circle (103a) or from the trusted user circle manager (124) updating the trusted user circle membership history (131a) due to the user C (101c) exiting the trusted user circle (103a). In one or more embodiments, the user device A (102a) may regenerate various different versions of the DPCK (106) by requesting corresponding versions the CPC identifier (133a) from the trusted user circle manager (124).

In one or more embodiments, the trusted user circle server (120) in cooperation with the user device A (102a) distribute various versions of the DPCK (106) upon creation thereof. Specifically, when the user A (101a) acts as the organizing user in processing new member addition and/or exiting member removal of the trusted user circle (103a) and/or an updated circle thereof (e.g., updated trusted user circle (103b)), the user device A (102a) downloads SPUKs of all current members of the trusted user circle (103a) or updated circles thereof. The downloaded SPUKs are used to encrypt the current version of the DPCK (106) for secure distribution to all current members. In one or more embodiments, the encrypted current version of the DPCK (106) is distributed via the trusted user circle server (120).

As shown in FIG. 1, upon processing the addition of the user B (101b) and user C (101c) as new members to the trusted user circle (103a), the user device A (102a) downloads the SPUK B (134b) and SPUK C (134c) to encrypt the DPCK (106) and generates the encrypted DPCK (EDPCK) B (135b) and the EDPCK C (135c). The EDPCK B (135b) and EDPCK C (135c) are then uploaded to the trusted user circle server (120) for use by the user B (101b) and user C (101c), respectively. In particular, the uploaded EDPCK B (135b) and EDPCK C (135c) are stored by the user manager (122) in the user A keys (106a) and the user B keys (106b), respectively where access requires authentication by the user manager (122). In addition, upon processing the removal of the user C (101c) who exits the trusted user circle (103a), the user device A (102a) generates the updated version of the DPCK (106) and downloads the SPUK B (134b) to encrypt the updated version of the DPCK (106), thus generating the updated EDPCK B (136b) for the user B (101b). The updated EDPCK B (136b) is then uploaded to the trusted user circle server (120) and stored by the user manager (122) in the user B keys (106b). In particular, since the user C (101c) is not a member of the updated trusted user circle (103b), the user device A (101a) does not generate any updated EDPCK using SPUK C (134c) and does not upload and store any additional EDPCK in the user C keys (106c). Although the user A (101a) is the creator of the DPCK (106), in one or more embodiments, an DPCK (106) and the updated version thereof are also encrypted using the SPUK A (134a) of the user A (101a) to generate the EDPCK A (135a) and the updated EDPACK A (136a) for uploading and storing in the user A keys (106a). In one or more embodiments, the user manager (122) manages various versions of the EDPCK based on corresponding CPC identifiers. As shown in FIG. 1, the EDPCK A (135a), EDPCK B (135b), and EDPCK C (135c) correspond to the trusted user circle (103a) and are linked to the CPC identifier (133a) contained in the trusted user circle profile A (131) of the trusted user circle (103a). Similarly, the updated EDPCK A (136a) and updated EDPCK B (136b) correspond to the updated trusted user circle (103b) and are linked to the updated CPC identifier (133b) contained in the trusted user circle profile A (131) of the trusted user circle (103a). Based on the user authentication described above, the user A keys (106a) is exclusively accessible by the user A (101a), the user B keys (106b) is exclusively accessible by the user B (101b), the user C keys (106c) is exclusively accessible by the user C (101ac), and so on and so forth.

Based on the EDPCK stored in the user keys (134) and managed by the user manager (122), any user who is a current member of a particular trusted user circle may encrypt all documents posted on the website (104) using a current version of the DPCK retrieved from a current version of his/her EDPCK. Specifically, the user requests his/her EDPCK from the user manager (122) and decrypt the EDPCK using his/her SPRK to retrieve the DPCK. Each encrypted document is then combined with metadata containing information (e.g., CPC identifier) of all members of the particular trusted user circle before the combination is posted on the website (104). The metadata may also contain un-encrypted advertisement or other URL information to facilitate a viewing user to join the trusted user circle. In one or more embodiments, the metadata is generated and combined with the encrypted document by the posting user device.

As shown in FIG. 1, prior to the user C (101c) exiting the trusted user circle (103a), the user B (101b) posted the posted document A (104a) using his EDPCK B (135b). In this context, the user B (101b) is referred to as a posting user and the user device B (102b) is referred to as a posting user device. In one or more embodiments, the posted document A (104a) includes an encrypted document and the associated metadata where the metadata contains the CPC identifier (133a). In addition, subsequent to the user C (101c) exiting the trusted user circle (103a), the user B (101b) posted the posted document B (104b) using his updated EDPCK B (136b). In one or more embodiments, the posted document B (104b) includes another encrypted document and the associated metadata thereof where the metadata contains the updated CPC identifier (133b).

The decryption of a posted document is based on the embedded CPC identifier. If a user is able to identify, based on the embedded CPC identifier, and has access to the correct version of the EDPCK corresponding to the posted document, then the user is able to decrypt the EDPCK using his/her SPRK and in turn decrypt the posted document for viewing. If the user is not associated with the embedded CPC identifier, then his/her EDPCK corresponding to the posted document is never generated and the user will not be able to decrypt the posted document for viewing.

As shown in FIG. 1, whether before or after the user C (101c) exiting the trusted user circle (103a), the user C (101c) is always able to identify his EDPCK B (135b) from the CPC identifier (133a) embedded in the metadata of the posted document A (104a). Accordingly, the user C (101c) uses his/her SPUK to decrypt the EDPCK B (135b) and retrieve the DPCK (106) for further decrypting the posted document A (104a). In this context, the user C (101c) is referred to as a viewing user and the user device C (102c) is referred to as a viewing user device. In contrast, because the posted document B (104b) is posted after the user C (101c) exiting the trusted user circle (103a), the user C (101c) is not able to identify any updated EDPCK, from the updated CPC identifier (133b) embedded in the metadata of the posted document B (104b), that he/she can decrypt using his/her SPRK. Accordingly, the user C (101c) may have access to the posted document B (104b) but is not able to decrypt for viewing.

Although embodiments described above are based on the public and private key pair of asymmetric cryptography, in other embodiments, symmetric cryptography may be used where one encryption key takes place of both the public key and the private key. In those embodiments, the SPUK and SPRK are the same and referred to as a static encryption key, while DPCK is referred to as a dynamic encryption key.

Figure 2A:
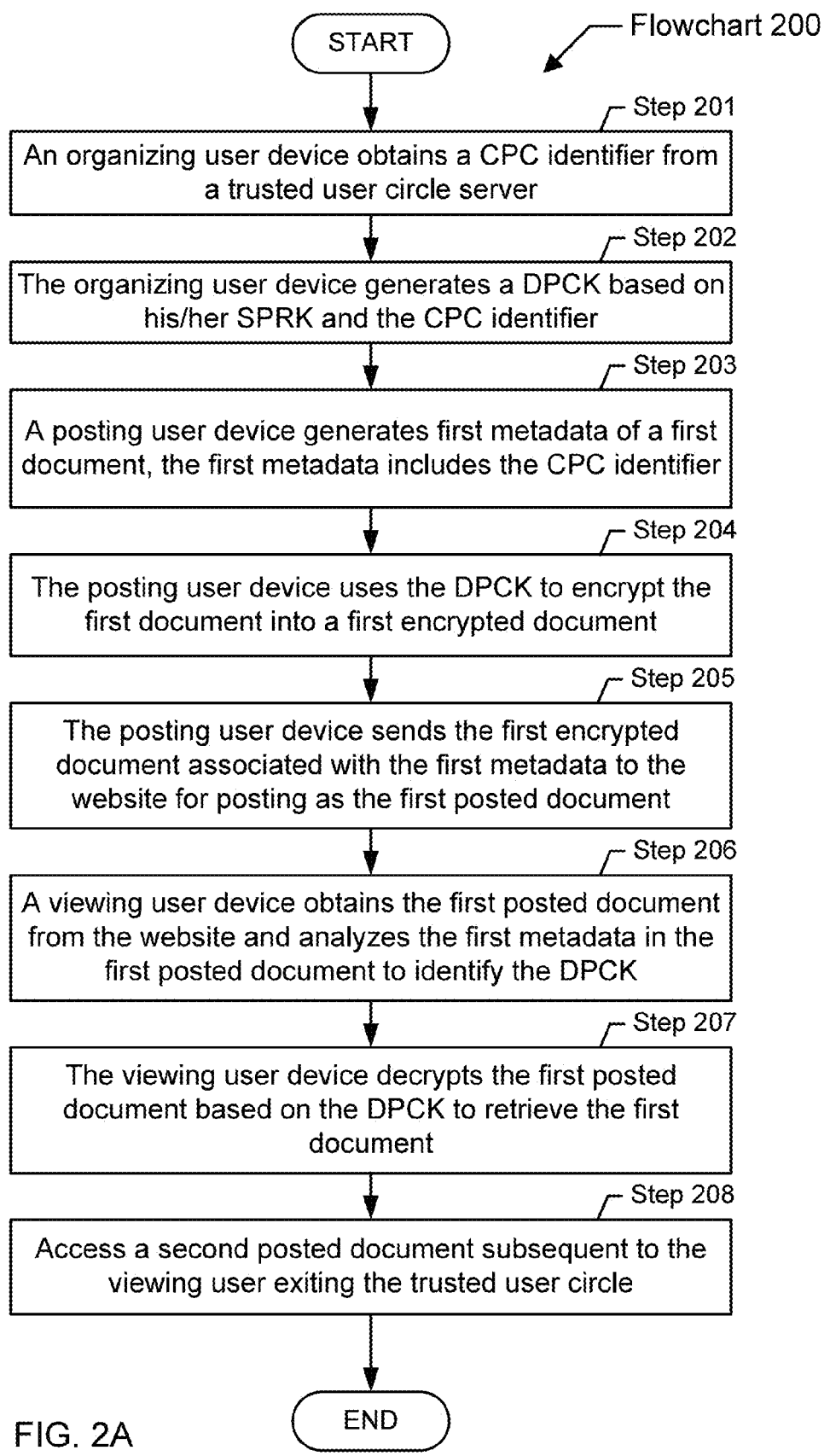
FIGS. 2A and 2B show a flowchart of a method of trusted user circles in accordance with one or more embodiments of the invention.
Figure 2B:
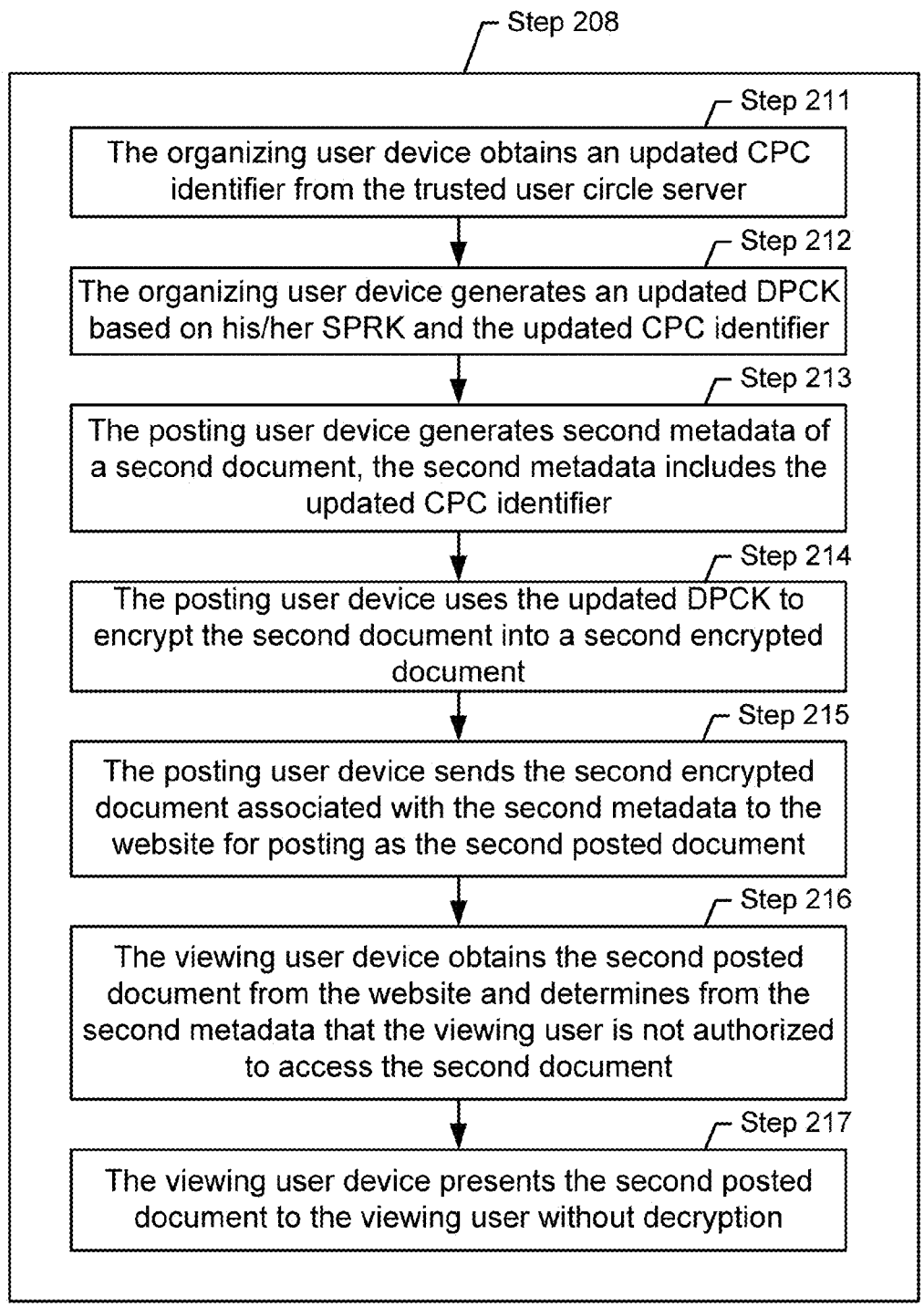

FIGS. 2A and 2B depicts a flowchart of a method in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B. In one or more embodiments, the method described in reference to FIGS. 2A and 2B may be practiced using the system (100) described in reference to FIG. 1 above.

FIG. 2A depicts a flowchart (200) of an example method for accessing a first posted document on a website by members of a trusted user circle. In one or more embodiments, members of the trusted user circle includes at least an organizing user, a posting user, and a viewing user. While the trusted user circle is initiated and organized by the organizing user, any member of the trusted user circle may post a document on the website and become the posting user for the posted document. In the same way, any member of the trusted user circle may retrieve a posted document for viewing and become the viewing user for the posted document.

Initially in Step 201, an organizing user device (used by an organizing user within the trusted user circle) obtains a circle policy context (CPC) identifier from a trusted user circle server separate from the website. Specifically, the CPC identifier identifies membership information maintained by the trusted user circle server for the trusted user circle. In one or more embodiments, the CPC identifier is initially generated by the trusted user circle server when the trusted user circle is initiated and organized by the organizing user. Subsequently, the CPC identifier may be updated as the membership of the trusted user circle evolves with additions of new members and removals of exiting members.

In Step 202, the organizing user device generates a dynamic private context key (DPCK) from a first static private key (SPRK) of the organizing user and the CPC identifier. Accordingly, the DPCK is provided to the trusted user circle for all members to encrypt and decrypt member posted documents on the website. In one or more embodiments, the DPCK is securely provided to each member of the trusted user circle via the trusted user circle server using the member's SPRK/SPUK (static public key) pair based on asymmetric cryptography. In one or more embodiments, the DPCK is linked with the CPC identifier in the trusted user circle server and the combination is accessible to all current members of the trusted user circle.

In Step 203, an posting user device (used by a posting user within the trusted user circle) generates first metadata of a first document, where the first metadata identifies the trusted user circle. In one or more embodiments, the CPC identifier is accessible from the trusted user circle server to all current members of the trusted user circle. In such embodiments, the first metadata includes the CPC identifier obtained from the trusted user circle by the posting user device.

In Step 204, the posting user device uses the DPCK of the trusted user circle to encrypt the first document into the first encrypted document.

In Step 205, the posting user device sends the first encrypted document associated with the first metadata to the website, where the first encrypted document associated with the first metadata is posted on the website as a first posted document.

In Step 206, the viewing user device obtains the first posted document from the website and analyzes the first metadata in the first posted document to retrieve the CPC identifier. In one or more embodiments, the viewing user identifies and obtains, from the trusted user circle based on the viewing user being within the trusted user circle, the DPCK linked to the retrieved CPC identifier.

In Step 207, in response to identifying the DPCK and based on the DPCK, the viewing user device decrypts the first posted document (in particular, the first encrypted document included therein) to retrieve the first document and present the first document to the viewing user.

In Step 208, a second posted document is accessed on the website. In particular, the second posted document is posted and otherwise accessed subsequent to a member exiting the trusted user group. Specifically, the exiting member has viewed the first posted document described above and is the viewing user referred to herein. Accordingly, the trusted user group becomes the updated trusted user group without the exiting member (i.e., the viewing user referred to herein). As noted above, any of the remaining members of the trusted user circle may also retrieve any posted document and become another viewing user. However, throughout the description of FIGS. 2A and 2B, the term "viewing user" refers to the particular viewing user described in Steps 206 and 207 above. Details of accessing the second posted document after the viewing user exiting the trusted user circle are described in reference to FIG. 2B below.

As shown in FIG. 2B, in step 211, in response to the viewing user exiting the trusted user circle, the organizing user device obtains an updated CPC identifier from the trusted user circle server. Specifically, the updated CPC identifier identifies updated membership information maintained by the trusted user circle for the updated trusted user circle.

In Step 212, the organizing user device generates the updated DPCK from the first SPRK of the organizing user and the updated CPC identifier. Accordingly, the updated DPCK is provided to the updated trusted user circle for all remaining members to encrypt and decrypt member posted documents on the website. In one or more embodiments, the updated DPCK is securely provided to each member of the updated trusted user circle via the trusted user circle server using the member's SPRK/SPUK (static public key) pair based on asymmetric cryptography. In one or more embodiments, the updated DPCK is linked with the updated CPC identifier in the trusted user circle server and the combination is accessible to all remaining members of the updated trusted user circle.

In Step 213, the posting user device generates second metadata of a second document, where the second metadata identifies the updated trusted user circle. In one or more embodiments, the updated CPC identifier is accessible from the trusted user circle server to all remaining members of the updated trusted user circle. In such embodiments, the second metadata includes the updated CPC identifier obtained from the trusted user circle by the posting user device.

In Step 214, the posting user device uses the updated DPCK to encrypt the second document into the second encrypted document.

In Step 215, the posting user device sends the second encrypted document associated with the second metadata to the website, where the second encrypted document associated with the second metadata is posted on the website as a second posted document.

In Step 216, the viewing user device obtains the second posted document from the website and analyzes the second metadata in the second posted document to determine that the viewing user is not authorized to access the second document from the website based on the viewing user being separate from the updated trusted user circle. In one or more embodiments, the viewing user device is not able to access the updated CPC identifier from the trusted user circle server based on the viewing user being separate from the updated trusted user circle. As a result, the viewing user device is not able to recognize the updated CPC identifier in the second metadata. Accordingly, the viewing user is not able to identify or obtain, from the trusted user circle server, the updated DPCK linked to the updated CPC identifier.

In Step 217, in response to determining that the viewing user is not authorized to access the second document from the website, the viewing user device presents the second posted document to the viewing user without decryption.

Although the description above relates to the viewing user device being able to decrypt the first encrypted document generated and posted by the posting user, as well as being unable to decrypt the second encrypted document generated and posted by the same posting user, in other examples, the first encrypted document and the second encrypted document may be generated and posted by different members of the trusted user circle or the updated trusted user circle.

Figure 3A:
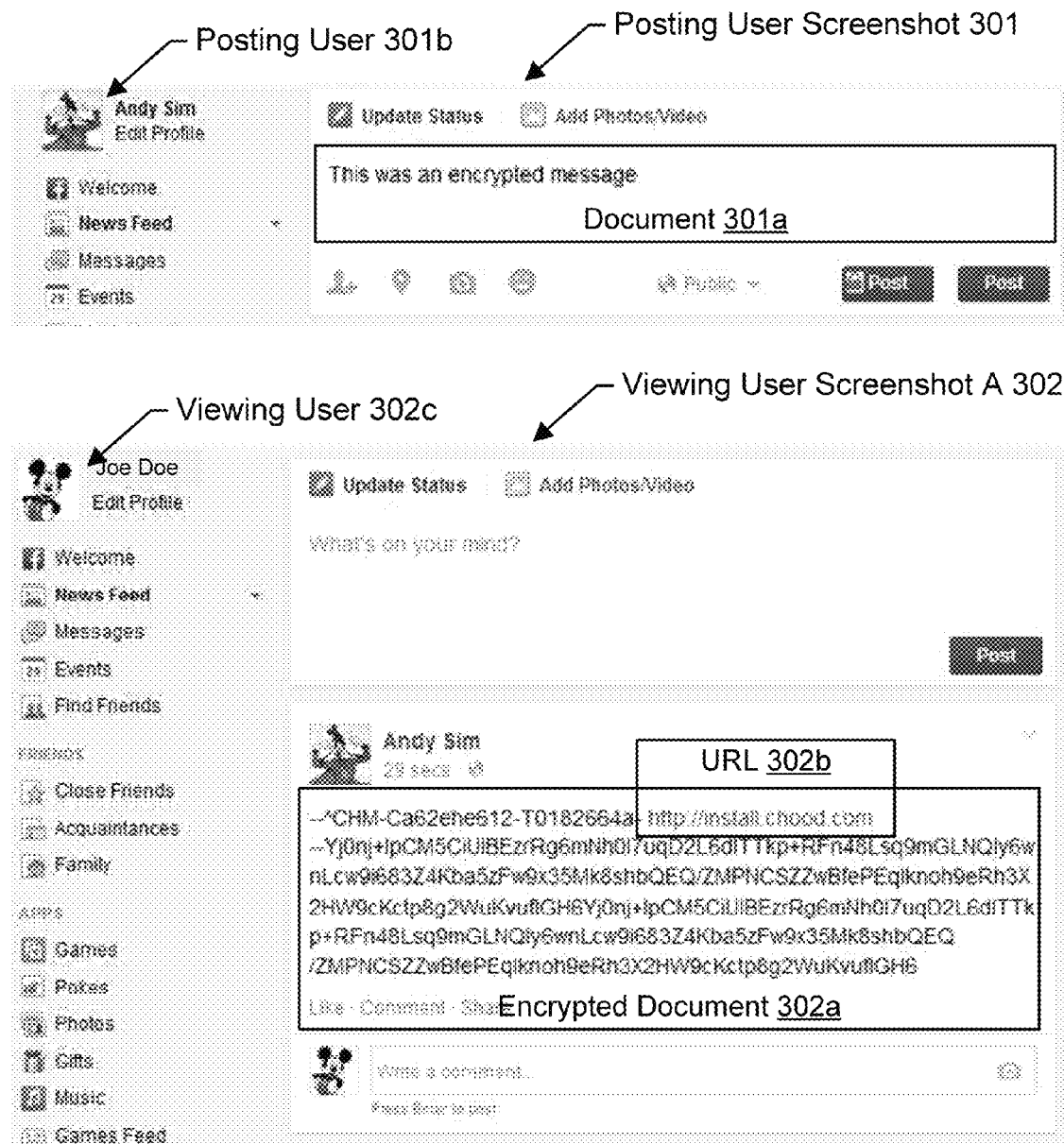
FIGS. 3A and 3B show an example of trusted user circles in accordance with one or more embodiments of the invention.
Figure 3B:
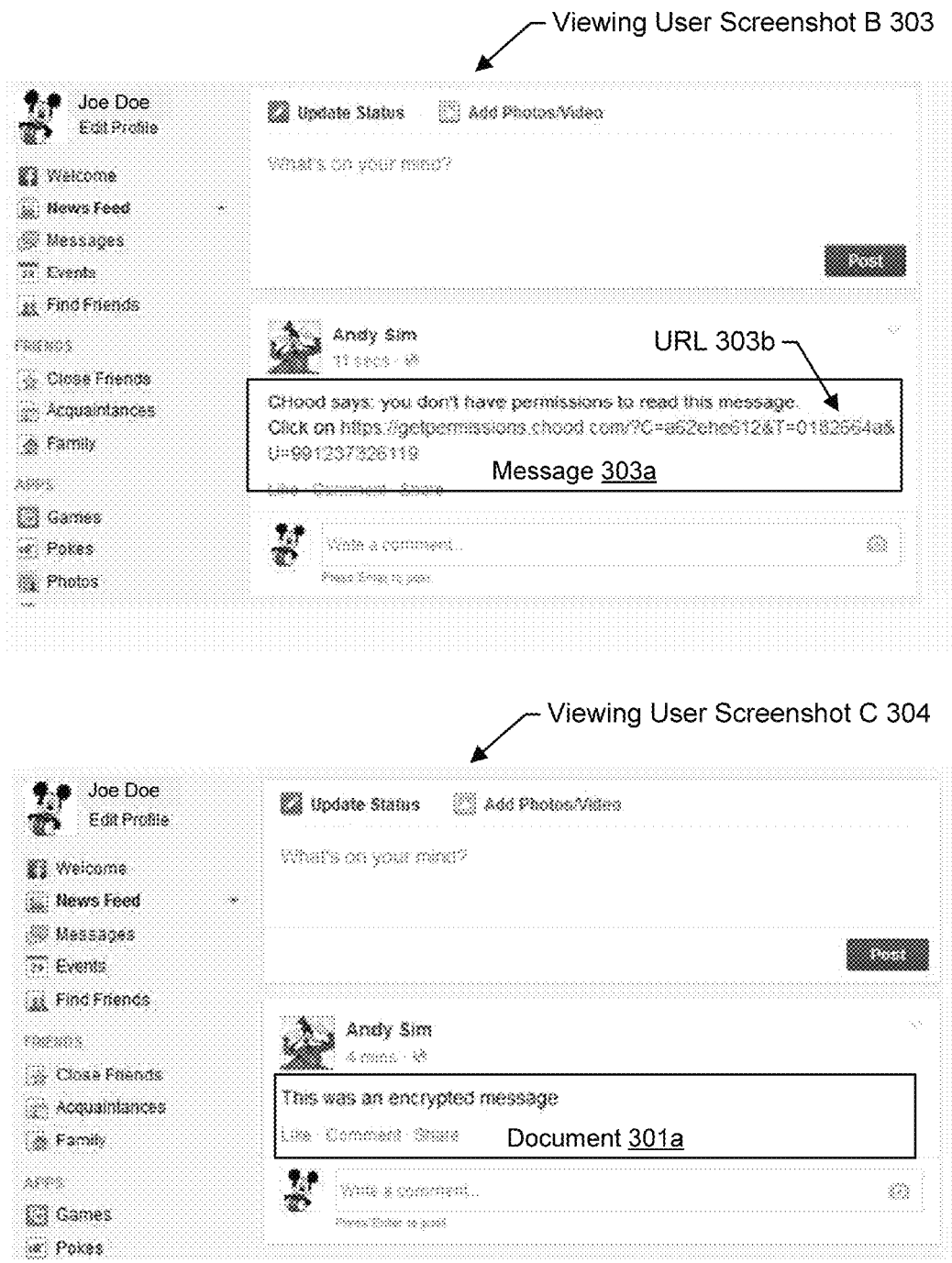
Figure 4:
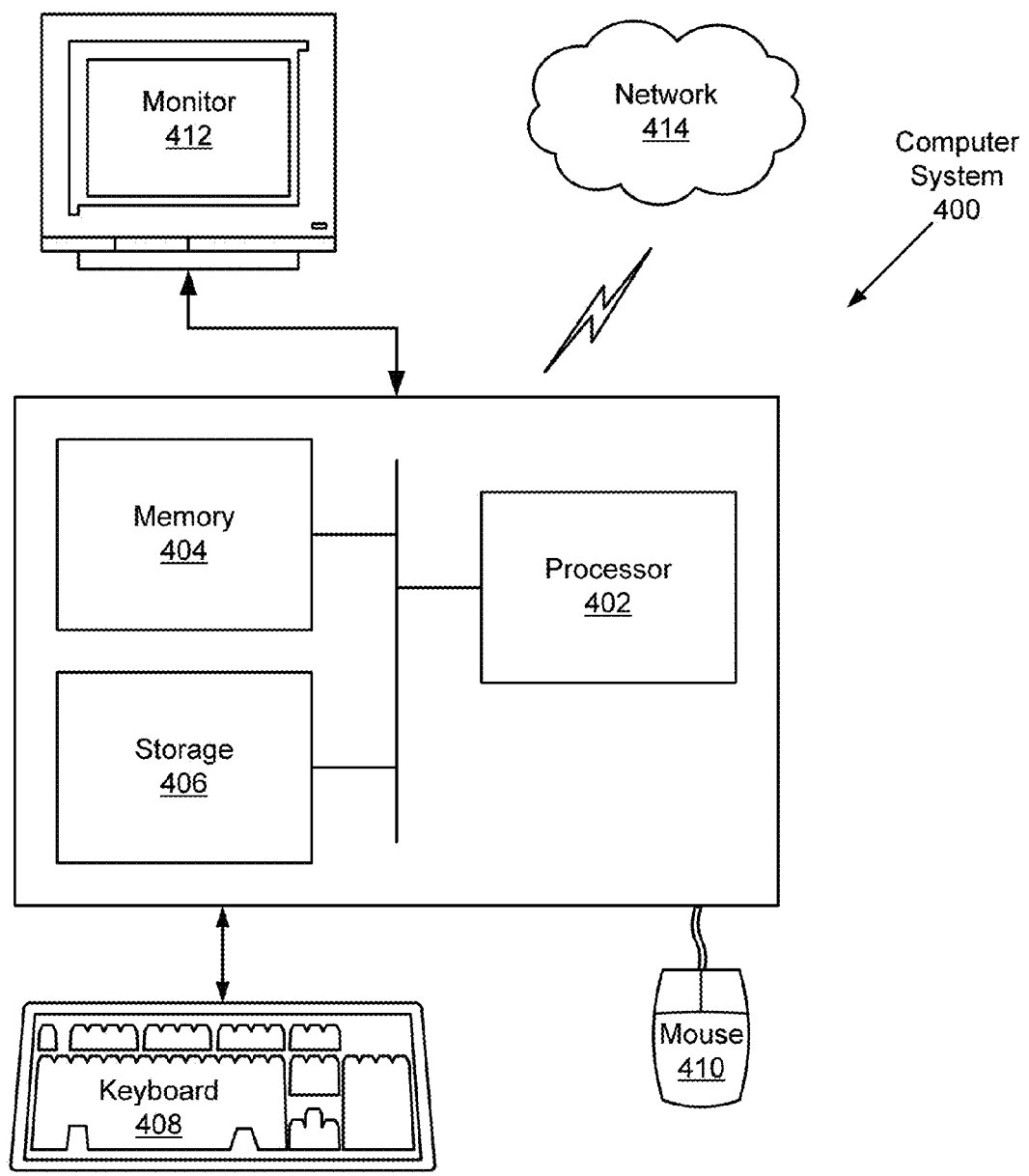
FIG. 4 shows a diagram of a computing system in accordance with one or more embodiments of the invention.

FIGS. 3A and 3B show an example of trusted user circles in accordance with one or more embodiments of the invention. This example may be based on the system (100) of FIG. 1 and the method described with respect to FIGS. 2A and 2B above.

FIG. 3A shows a posting user screenshot (301) and a viewing user screenshot A (302). In particular, the posting user screenshot (301) corresponds to a browser window on a tablet computer (referred to as the posting user device) used by a trusted user circle member Andy (shown as the posting user (301b)). Specifically, Andy has posted the document (301a) in an encrypted format on a social network website. The encryption is performed by a browser-plugin installed on Andy's tablet computer that performs the client portion of the authentication/encryption/decryption tasks described in reference to FIGS. 1, 2A, and 2B above. The posting user screenshot (301) shows Andy's browser window displaying the social network postings where the document (301a) is displayed in the decrypted format. Again, the decryption is performed by the browser-plugin installed on Andy's posting user device.

Further as shown in FIG. 3A, the viewing user screenshot A (302) corresponds to a browser window on a smartphone (referred to as the viewing user device) used by Joe (shown as the viewing user (302c)) who has not installed on the smartphone any mobile app that performs the client portion of the authentication/encryption/decryption tasks described in reference to FIGS. 1, 2A, and 2B above. For example, Joe may not be a member of the trusted user circle where Andy belongs. In another example, Joe may be a member or ex-member of the same trusted user circle where Andy belongs but just bought the smartphone and has not had a chance to install the mobile app yet. The viewing user screenshot A (302) shows Joe's browser window displaying Andy's posted document on the social network website where Andy's posted document (shown as encrypted document (302a)) is displayed in the encrypted format. In addition, a URL link (URL (302b)) is displayed along with the encrypted document (302a) allowing Joe to install the mobile app by clicking on the URL (302b)). After Joe successfully installed the mobile app, the browser window shown as the viewing user screenshot A (302) is redirected as shown in FIG. 3B below.

FIG. 3B shows a viewing user screenshot B (303) and a viewing user screenshot C (304). In particular, the viewing user screenshot B (303) corresponds to the re-directed browser window on Joe's smartphone after Joe installed on the smartphone the mobile app that performs the client portion of the authentication/encryption/decryption tasks described in reference to FIGS. 1, 2A, and 2B above. In one example scenario, although the mobile app is installed, Joe has not joined the trusted user circle where Andy belongs. In another example scenario, Joe as a member of the same trusted user circle where Andy belongs but has exit the trusted user circle. In either scenario, the viewing user screenshot B (303) shows Andy's posted document (shown as encrypted document (302a) in FIG. 3A) is replaced by the message (303a) after the installed mobile app is launched. Specifically, the message (303a) indicates that Joe does not have permissions to view Andy's posted document and invites Joe to join or rejoin the trusted user circle by clicking on the URL (303b)).

Further as shown in FIG. 3B, the viewing user screenshot C (304) corresponds to a browser window on Joe's smartphone after Joe joins or rejoins the same trusted user circle where Andy belongs. Specifically, the viewing user screenshot C (304) shows Andy's posted document (301a) is now displayed in the decrypted format. The decryption is performed by the mobile app just installed on Joe's smartphone that performs the client portion of the authentication/encryption/decryption tasks described in reference to FIGS. 1, 2A, and 2B above. Similar to the viewing user screenshot C (304), any other current member of this trusted user circle who has the correct browser-plugin or mobile app installed on his/her user device is able to view Andy's posted document (301a) in the decrypted format.

Embodiments of the invention may be implemented on virtually any type of computer regardless of the platform being used. For example, as shown in FIG. 3B, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to view user posted documents on a website, comprising:

generating, by an posting user device used by an posting user, first metadata of a first document, wherein the first metadata identifies a trusted user circle comprising the posting user and a viewing user; encrypting, by the posting user device based on a dynamic private context key (DPCK) of the trusted user circle, the first document to generate a first encrypted document, wherein the DPCK is provided to the trusted user circle;

sending, by the posting user device to the website, the first encrypted document associated with the first metadata, wherein the first encrypted document associated with the first metadata is posted on the website as a first posted document, wherein the first posted document is obtained from the website by a viewing user device used by the viewing user;

analyzing, by the viewing user device, the first metadata in the first posted document to identify the DPCK based on the viewing user being within the trusted user circle; and decrypting, by the viewing user device in response to identifying the DPCK and based on the DPCK, the first posted document to retrieve the first document to present to the viewing user, wherein, updating, in response to the viewing user exiting the trusted user circle, the DPCK to generate an updated DPCK, wherein the updated DPCK is provided to an updated trusted user circle comprising the trusted user circle without the viewing user;

generating, by the posting user device, second metadata of a second document, wherein the second metadata identifies the updated trusted user circle;

encrypting, by the posting user device based on the updated DPCK, the second document to generate a second encrypted document;

sending, by the posting user device to the website, the second encrypted document associated with the second metadata, wherein the second encrypted document associated with the second metadata is posted on the website as a second posted document, wherein the second posted document is obtained from the website by the viewing user device used by the viewing user separate from the updated trusted user circle;

analyzing, by the viewing user device, the second metadata in the second posted document to determine that the viewing user is not authorized to access the second document from the website based on the viewing user being separate from the updated trusted user circle; and presenting, by the viewing user device in response to determining that the viewing user is not authorized to access the second document from the website, the second posted document to the viewing user without decryption.

2. The method of claim 1, further comprising: obtaining, by an organizing user device used by an organizing user within the trusted user circle, a circle policy context (CPC) identifier from a trusted user circle server separate from the website, wherein the CPC identifier identifies membership information maintained by the trusted user circle server for the trusted user circle; and generating, by the organizing user device, the DPCK from a first static private key (SPRK) of the organizing user and the CPC identifier.

3. The method of claim 2, further comprising:

obtaining, by the organizing user device from the trusted user circle and in response to the viewing user exiting the trusted user circle, an updated CPC identifier identifying updated membership information maintained by the trusted user circle for the updated trusted user circle; and generating, by the organizing user device, the updated DPCK from the first SPRK of the organizing user and the updated CPC identifier.

4. The method of claim 2, wherein the viewing user joins the trusted user circle in response to an invitation sent by the organizing user device to the viewing user device the via the trusted user circle server.

5. The method of claim 2, wherein the DPCK is provided to the trusted user circle via the trusted user circle server, and wherein providing the DPCK to the trusted user circle comprises:

obtaining, by the organizing user device from the trusted user circle server, a static public key (SPUK) of the viewing user;

encrypting, by the organizing user device and based on the SPUK, the DPCK to generate an encrypted DPCK for sending to the viewing user device; and decrypting, by the viewing user device based on a second SPRK of the viewing user, the encrypted DPCK to retrieve the DPCK.

6. The method of claim 2, further comprising:

generating, by the trusted user circle server, the CPC identifier in response to a pre-determined event, wherein the pre-determined event comprises at least one selected from a group consisting of creation of the trusted user circle, member exiting the trusted user circle, and expiration of the DPCK.

7. A system for viewing user posted documents on a website, comprising:

a trusted user circle server separate from the website and configured to:

maintain membership information of a trusted user circle, wherein the trusted user circle comprises an posting user and a viewing user; and provide a dynamic private context key (DPCK) of the trusted user circle to members of the trusted user circle; an posting user device used by the posting user and configured to: generate first metadata of a first document, wherein the first metadata identifies the trusted user circle;

encrypt, based on the DPCK obtained from the trusted user circle server, the first document to generate a first encrypted document; and send, to the website, the first encrypted document associated with the first metadata, wherein the first encrypted document associated with the first metadata is posted on the website as a first posted document; and a viewing user device used by the viewing user and configured to: obtain the first posted document from the website; analyze the first metadata in the first posted document to identify the DPCK based on the viewing user being within the trusted user circle; and decrypt, in response to identifying the DPCK and based on the DPCK, the first posted document to retrieve the first document to present to the viewing user, wherein the trusted user circle server is further configured to: maintain, in response to the viewing user exiting the trusted user circle, updated membership information of an updated trusted user circle, wherein the updated trusted user circle comprises the trusted user circle without the viewing user; and provide, in response to the viewing user exiting the trusted user circle, an updated dynamic private context key (DPCK) of the updated trusted user circle to members of the updated trusted user circle, wherein the posting user device is further configured to:

generate metadata of a second document, wherein the second metadata identifies the updated trusted user circle;

encrypt, based on the updated DPCK obtained from the trusted user circle server, the second document to generate a second encrypted document; and send, to the website, the second encrypted document associated with the second metadata, wherein the second encrypted document associated with the second metadata is posted on the website as a second posted document, and wherein the viewing user device is further configured to: obtain the second posted document from the website;

analyze the second metadata in the second posted document to determine that the viewing user is not authorized to access the second document from the website based on the viewing user being separate from the updated trusted user circle; and present, in response to determining that the viewing user is not authorized to access the second document from the website, the second posted document to the viewing user without decryption.

8. The system of claim 7, further comprising an organizing user device used by an organizing user within the trusted user circle, wherein the organizing user device is configured to: obtain a circle policy context (CPC) identifier from the trusted user circle server, wherein the CPC identifier identifies the membership information maintained by the trusted user circle server for the trusted user circle; and generate the DPCK from a first static private key (SPRK) of the organizing user and the CPC identifier.

9. The system of claim 8, the organizing user device further configured to:

obtain, from the trusted user circle and in response to the viewing user exiting the trusted user circle, an updated CPC identifier identifying updated membership information maintained by the trusted user circle for the updated trusted user circle; and generate the updated DPCK from the first SPRK of the organizing user and the updated CPC identifier.

10. The system of claim 8, the trusted user circle server further configured to:

receive, from the organizer user device, a request to invite the viewing user to join the trusted user circle; and send, in response to the request, an invitation to the viewing user device to invite the viewing user to join the trusted user circle, wherein the viewing user joins the trusted user circle in response to the invitation.

11. The system of claim 8, wherein the organizing user device is further configured to: obtain, from the trusted user circle server, a static public key (SPUK) of the viewing user; and encrypt, by the organizing user device based on the SPUK, the DPCK to generate an encrypted DPCK for sending to the viewing user device, and wherein the viewing user device is further configured to: decrypt, based on a second SPRK of the viewing user, the encrypted DPCK to retrieve the DPCK.

12. The system of claim 8, the trusted user circle server further configured to:

generate the CPC identifier in response to a pre-determined event, wherein the pre-determined event comprises at least one selected from a group consisting of creation of the trusted user circle, member exiting the trusted user circle, and expiration of the DPCK.

13. The system of claim 8, the trusted user circle server further configured to:

authenticate, based on a first static public key (SPUK) associated with the first SPRK of the organizing user, the organizing user to access the trusted user circle server;

authenticate, based on a second SPUK associated with a second SPRK of the posting user, the posting user to access the trusted user circle server; and authenticate, based on a third SPUK associated with a third SPRK of the viewing user, the viewing user to access the trusted user circle server.

14. A non-transitory computer readable medium storing instructions for viewing user posted documents on a website, the instructions when executed by a computer processor comprising functionality to:

generate, by an posting user device used by an posting user, first metadata of a first document, wherein the first metadata identifies a trusted user circle comprising the posting user and a viewing user;

encrypt, by the posting user device based on a dynamic private context key (DPCK) of the trusted user circle, the first document to generate a first encrypted document, wherein the DPCK is provided to the trusted user circle;

send, by the posting user device to the website, the first encrypted document associated with the first metadata, wherein the first encrypted document associated with the first metadata is posted on the website as a first posted document, wherein the first posted document is obtained from the website by a viewing user device used by the viewing user;

analyze, by the viewing user device, the first metadata in the first posted document to identify the DPCK based on the viewing user being within the trusted user circle; and decrypt, by the viewing user device in response to identifying the DPCK and based on the DPCK, the first posted document to retrieve the first document to present to the viewing user, wherein, the instructions when executed by the computer processor further comprising functionality to:

update, in response to the viewing user exiting the trusted user circle, the DPCK to generate an updated DPCK, wherein the updated DPCK is provided to an updated trusted user circle comprising the trusted user circle without the viewing user;

generate, by the posting user device, second metadata of a second document, wherein the second metadata identifies the updated trusted user circle;

encrypt, by the posting user device based on the updated DPCK, the second document to generate a second encrypted document;

send, by the posting user device to the website, the second encrypted document associated with the second metadata, wherein the second encrypted document associated with the second metadata is posted on the website as a second posted document, wherein the second posted document is obtained from the website by the viewing user device used by the viewing user separate from the updated trusted user circle;

analyze, by the viewing user device, the second metadata in the second posted document to determine that the viewing user is not authorized to access the second document from the website based on the viewing user being separate from the updated trusted user circle; and present, by the viewing user device in response to determining that the viewing user is not authorized to access the second document from the website, the second posted document to the viewing user without decryption.

15. The non-transitory computer readable medium of claim 14, the instructions when executed by the computer processor further comprising functionality to: obtain, by an organizing user device used by an organizing user within the trusted user circle, a circle policy context (CPC) identifier from a trusted user circle server separate from the website, wherein the CPC identifier identifies membership information maintained by the trusted user circle server for the trusted user circle; and generate, by the organizing user device, the DPCK from a first static private key (SPRK) of the organizing user and the CPC identifier.

16. The non-transitory computer readable medium of claim 15, the instructions when executed by the computer processor further comprising functionality to:

obtain, by the organizing user device from the trusted user circle and in response to the viewing user exiting the trusted user circle, an updated CPC identifier identifying updated membership information maintained by the trusted user circle for the updated trusted user circle; and generate, by the organizing user device, the updated DPCK from the first SPRK of the organizing user and the updated CPC identifier.

17. The non-transitory computer readable medium of claim 15, wherein the DPCK is provided to the trusted user circle via the trusted user circle server, and wherein providing the DPCK to the trusted user circle comprises:

obtaining, by the organizing user device from the trusted user circle server, a static public key (SPUK) of the viewing user;

encrypting, by the organizing user device and based on the SPUK, the DPCK to generate an encrypted DPCK for sending to the viewing user device; and decrypting, by the viewing user device based on a second SPRK of the viewing user, the encrypted DPCK to retrieve the DPCK.

\* \* \* \* \*